Feb. 27, 1951 E. H. APPEL 2,543,563
AGRICULTURAL LOADING MACHINE
Filed Sept. 24, 1947 2 Sheets-Sheet 1
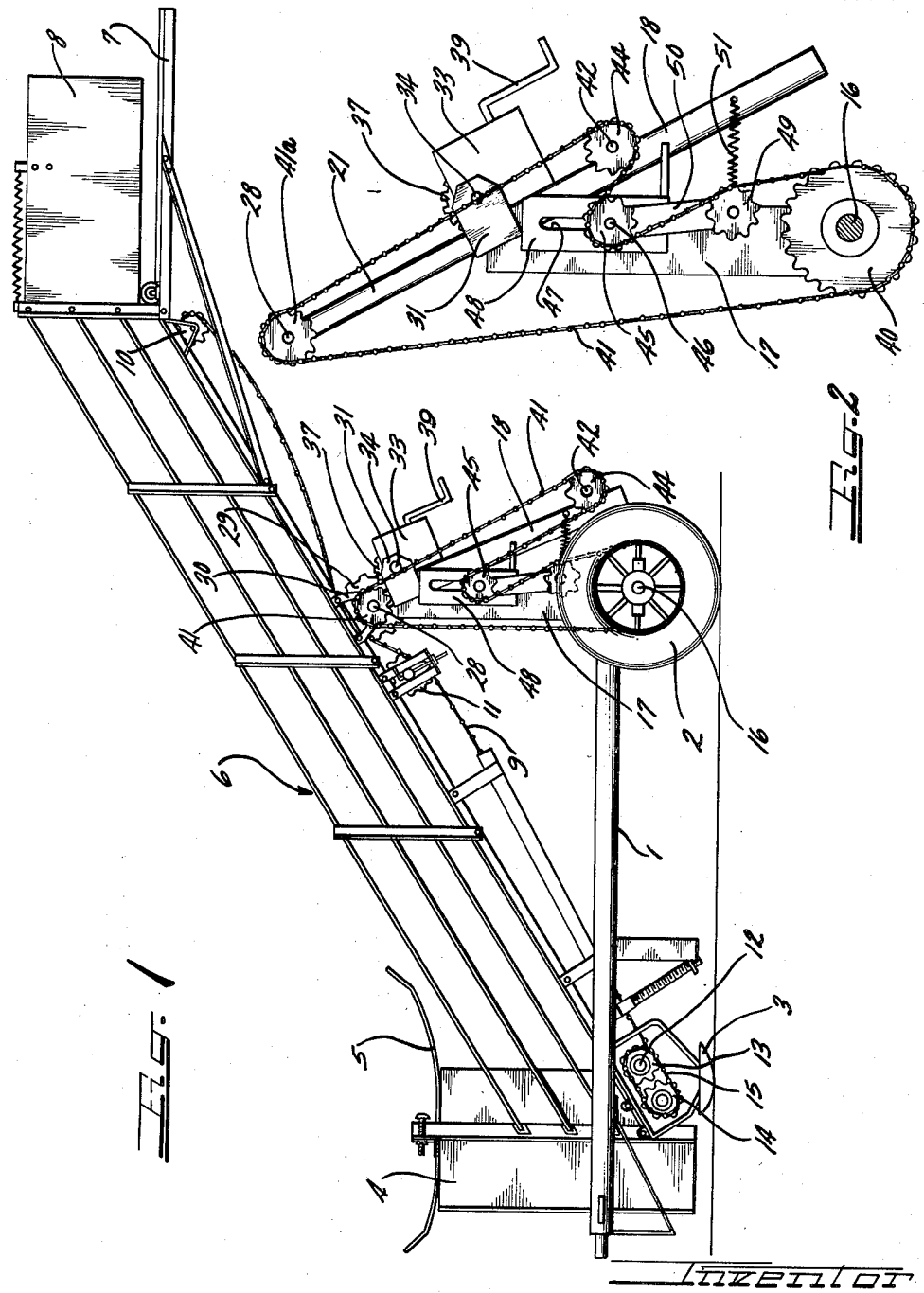
Inventor
EVERETT H. APPEL
by The Firm of Charles W. Hills
Attys.

Feb. 27, 1951 E. H. APPEL 2,543,563
AGRICULTURAL LOADING MACHINE
Filed Sept. 24, 1947 2 Sheets-Sheet 2
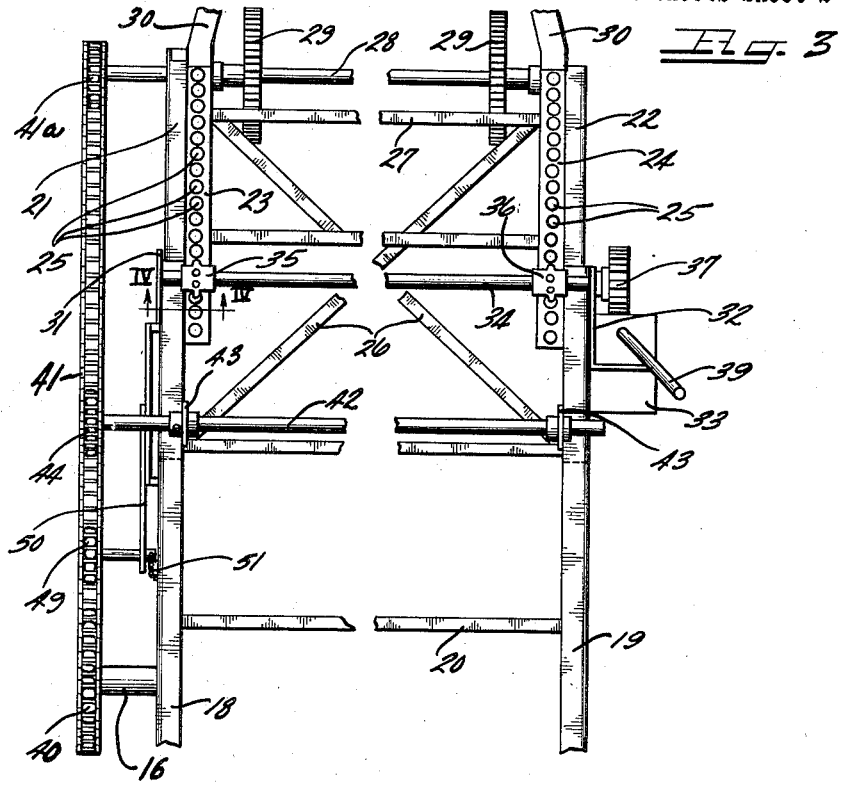
Inventor
EVERETT H. APPEL
By The Firm of Charles H. Lilly
Attys.

Patented Feb. 27, 1951

2,543,563

UNITED STATES PATENT OFFICE 2,543,563

AGRICULTURAL LOADING MACHINE

Everett H. Appel, Aurora, Ill.

Application September 24, 1947, Serial No. 775,778

7 Claims. (Cl. 198—233)

This invention relates to improvements in an agricultural loading machine with elevating means, and more particularly to a mobile loading machine highly desirable for use in juxtaposition to a transporting vehicle for the elevating of bales, shocks and similar items to an adequate level for properly piling upon the transporting vehicle, although the invention may have other uses and purposes as will be apparent to one skilled in the art.

The instant invention is an improvement upon the agricultural loading machine set forth, described and claimed in my copending application for patent filed April 19, 1944, Serial No. 531,693, issued in Patent No. 2,460,441, February 1, 1949.

The instant invention is the type of mobile loading machine that may be positioned alongside or adjacent to a transporting vehicle, and move along uniformly with the transporting vehicle, picking up bales, shocks, and similar loads from the ground and elevating them to a proper height for discharge into the body of the transporting vehicle as both vehicles move along together. Difficulty has been experienced in the past in providing a loading machine sufficiently economical to be purchased by the greater majority of farmers and yet one that might readily be used with various types, sizes, and heights of transporting vehicles. In most instances, loading machines known heretofore elevated a load to a set height, and it was up to the attendant to get that load into the transporting vehicle from that particular set height, regardless of the height of the body of the transport vehicle.

With the foregoing in mind, it is an important object of the instant invention to provide an economical mobile loading machine embodying an inclined loading trough with means to selectively vary the height of the loading trough, at least at its upper edge, to adjust the machine for use with transporting vehicles of various heights.

Also an object of this invention is the provision of a loading machine with simple manually operable means to selectively adjust and hold the upper end of an inclined loading trough in a desired degree of elevation while the lower end remains in load pickup position.

Still another object of this invention is the provision of a loading machine including fixed and movable frame portions with an inclined loading trough pivoted to the movable frame portion, and wherein that movable frame portion may be adjusted upwardly and downwardly to selectively vary the height of the upper end of the trough.

Another feature of this invention resides in the provision of a mobile loading machine embodying an inclined loading trough which is pivotally connected to one of a pair of telescopically associated frame portions, and the machine is provided with easily operable means for adjusting the telescoping portions to selectively vary the height of the upper end of the loading trough.

It is also an object of this invention to provide a simple form of mobile loading machine embodying an inclined loading trough with an endless conveyor associated therewith, and with means to drive that conveyor from one of the wheels of the machine, there also being a simple form of adjustment easily operated to selectively vary the height of the upper end of the loading trough, while the machine is operating or stationary, and without disturbing the driving means between the wheel and the conveyor.

Still a further object of this invention resides in the provision of a mobile loading machine embodying an inclined loading chute provided with an endless conveyor, with means to drive the conveyor from a wheel of the machine, those means being in the form of a chain and sprocket arrangement, a part of which is carried by a movable frame portion and a part by a fixed frame portion, the arrangement being such that there is a reentrant reach or loop in the chain that may vary in size without interfering with the drive of the conveyor as the movable frame portion is elevated or lowered relatively to the fixed frame portion.

While some of the more salient features, characteristics and advantages of the instant invention have been above pointed out, others will become apparent from the following disclosures taken in conjunction with the accompanying drawings, in which:

Figure 1 is a side elevational view of a loading machine equipped with elevating means embodying improvements of the instant invention;

Figure 2 is a fragmentary enlarged vertical sectional view taken just inside the traction wheel of Figure 1, illustrating a side view of the conveyor drive and elevating means;

Figure 3 is a fragmentary rear elevational view of the central portion of the structure of Figure 1;

Figure 4 is a greatly enlarged bottom plan sectional view taken substantially as indicated by the line IV—IV of Figure 3, looking in the direction of the arrows; and Figure 5 is a fragmentary side elevational view taken from the right hand side of Figure 3.

As shown on the drawings:

In the illustrated embodiment of this invention, there is shown a loading machine of the general character more fully set forth, described and claimed in my aforesaid copending application. The machine includes an undercarriage 1 carried on wheels 2 at the rear end, and connected in any suitable manner to a power vehicle at the forward end. A skid 3 may be utilized adjacent the forward end of the machine during the picking up of a bale or other load, suitable straightening means 4 being provided at the forward end of the machine, and above these straightening means are guiding means 5.

The machine also includes an inclined loading trough or chute 6 mounted in a manner to be later described, and the straightening and guiding means 4 and 5 may be carried on the lower and forward end of the loading trough. At the upper and rear end of the loading trough there is a discharge platform 7 over which a spring urged gate 8 is mounted to guide bales or other loads laterally or sidewise of the discharge platform into the transporting vehicle. This gate construction also functions as a release means in case of overload to prevent jamming, all in a manner more fully set forth, described and claimed in my copending application entitled "Discharge Arrangement for Agricultural Loading Machines," filed June 16, 1947, Serial No. 755,089.

Associated with the loading trough to propel the various loads upwardly therealong is an endless conveyor, not fully shown in the drawings, but including a sprocket chain 9 on each side thereof. Each chain 9 extends over an upper sprocket 10 adjacent the top of the chute, a tensioning sprocket 11 adjacent the central portion of the chute, and a sprocket adjacent the lower and forward end of the chute or trough carried on a shaft 12. This endless conveyor provides the drive with a sprocket 13 on each end of the shaft 12 which in turn drives a rotary load pickup device 14 by way of a chain 15. The pickup device engages a load, such as a bale, and elevates that load sufficiently for it to be engaged by the conveyor and carried up the inclined trough to and off the discharge platform.

The wheels 2 are carried on an axle 16, and this axle supports a generally upright fixed frame portion including an upright supporting member 17 seen clearly in Figures 1 and 2, there being a similar member on the opposite side of the machine. These members may be connected by cross braces in any suitable manner, if so desired. Secured both to the upright 17 and the undercarriage 1 is an inclined channel member 18 preferably opening inwardly. A similar channel member 19, also opening inwardly to confront the member 18 is disposed on the opposite side of the machine, and these members may be connected together at intervals by cross braces 20 (Figure 3) wherever such bracing may be deemed necessary.

A movable frame portion is associated with the fixed frame portion just above described. This movable frame portion also includes a pair of opposed confronting channel members 21 and 22, seen best in Figures 3 and 4, and which are of such size as to telescope intimately inside the fixed channel members 18 and 19 so as to be slidable upwardly and downwardly relatively to those fixed members. Each of the channel members 21 and 22 has an inwardly extending flange member secured thereto, these members being designated by numerals 23 and 24, respectively, and each such member being provided with a plurality or more accurately a series of apertures 25. In view of the load carried by the movable frame portion, the channel members 21 and 22 are also preferably connected together by means of diagonal and transverse brace rods 26 and 27, respectively.

At the upper end thereof the movable frame portion carries a transverse shaft 28 to which is affixed a pair of spaced sprocket wheels 29—29 for engagement with the conveyor chains 9—9. The entire inclined loading trough portion 6 is also pivotally connected to this shaft 28 by means of a suitable yoke 30 (Figures 1 and 3) on each side thereof. It will be noted that the trough is so pivotally connected to the movable frame portion intermediate the ends of the trough so that when the movable frame portion is elevated with respect to the fixed frame portion, the loading trough is also elevated, and pivots about the shaft 28 so that the lower end of the trough will remain in load pickup position, while the upper end of the trough will be elevated to a desired degree in accordance with the particular transporting vehicle with which the loading machine may then be associated.

Simple manually operable means are provided to selectively raise and lower the movable frame portion and likewise the upper end of the loading trough. These means include a rearwardly extending bracket 31 secured to the upper end of the fixed channel member 18, and a rearwardly extending bracket 32 provided with a box-like housing 33 secured to the opposite fixed channel member 19. A transverse shaft 34 is journalled in the bracket members 31 and 32, and adjacent the ends thereof this shaft carries a sprocket 35 for engagement with the holes in the flange 23 on the movable frame member channel 21, sprocket 36 for engagement with the holes in the flange member 24 on the opposite channel member. Above the housing 33 the shaft 34 projects sufficiently to carry a gear or pinion 37 which is keyed to the shaft. Beneath that pinion 37 a worm wheel 38 is mounted for rotation and may be turned by means of a suitable crank 39. When this crank is turned clockwise as viewed in Figure 3, the shaft 34 will be rotated so as to cause the sprockets 35 and 36 to elevate the movable frame portion by virtue of the engagement of these sprockets with the holes in the flange members 23 and 24, and the entire movable frame portion together with the upper end of the loading trough may be elevated to a desired degree. A reverse movement of the handle 39 obviously lowers the upper end of the loading trough, and any means may be provided, if necessary, to lock the handle in a desired position of adjustment. As the upper end of the loading trough is raised, the channel members 21 and 22 slide upwardly inside the fixed channel members 18 and 19, and when the movable frame portion is lowered the channel members 21 and 22 slide downwardly into the channels 18 and 19. Thus, with this construction, there is a rigid stable connection between the movable and fixed frame portions at all times. As the structure is viewed in Figure 1, movable frame portion is dropped to its full extent, and the upper end of the loading trough is at its low position. As the elevating structure is seen in Figures 2 and 3, the movable frame member has been raised substantially to maximum position so that the upper end of the loading trough would be in high position with the elevating means so adjusted. Obviously, any intermediate position may be acquired at will by the simple manual manipulation of the handle 39. Accordingly, the loading machine may readily be adjusted for association with transporting vehicles of various heights.

The endless conveyor associated with the loading trough is preferably driven from one of the wheels 2, and the drive arrangement must not be affected in any manner by the elevation or lowering of the upper end of the loading trough. To this end, I have provided a novel chain and sprocket arrangement a part of which is associated with the fixed frame portion and a part of which is associated with the movable frame portion, the whole arrangement being so fabricated that the movable frame portion may readily be raised and lowered without affecting the operation of the conveyor drive. As seen more clearly in Figures 1 and 2, the conveyor drive includes a sprocket 40 mounted on the wheel axle 16 for rotation therewith. A drive chain 41 is trained around this sprocket and also around a sprocket 41a carried on the aforesaid shaft 28 on the movable frame portion at the upper end thereof. Adjacent the lower end of the movable frame portion is another transverse shaft 42 carried in a pair of angle members 43—43 secured to the channel members 21 and 22. This shaft also carries a sprocket 44, both the sprockets 41 and 44, of course, moving upwardly and downwardly with the movable frame portion. Another sprocket 45 is carried on a stub shaft 46 slidable upwardly and downwardly in a slot 47 in a mounting bracket 48 attached to the fixed frame portion. The chain 41 in its continuous reach passes over the upper sprocket 41a, downwardly over the sprocket 44, and then inwardly and upwardly around the sprocket 45 from which it descends to the drive sprocket 40. The training of this chain over the sprocket 45 on the fixed frame portion provides a reentrant reach or loop in the chain which varies as to its depth along with the variation in the height of the movable frame portion. For example, when the movable frame portion is at bottom position as seen in Figure 1, there is a definite and long reentrant loop over the sprocket 45, while when this movable frame portion is moved to upper position, the sprockets 40 and 41a being carried upwardly along with that frame portion, the reentrant reach is reduced in depth. During any such motions, therefore, the chain 41 is always in operative position and tension is maintained by means of a rider sprocket 49 carried on the lower end of an arm 50 pivoted to the shaft 46, which arm is urged rearwardly by spring 51 to force the sprocket 49 against the chain at all times.

With this structure, it will be noted that whenever the wheel 2 is rotated the sprocket 40 is driving the chain 41 and causing that chain in turn to drive the shaft 28 and the sprockets 29—29 (Figure 3) which actuate the endless conveyor associated with the loading chute. That operation of the conveyor continues as long as the wheels 2 are in motion and it makes no difference what position of adjustment the upper end of the loading trough may be in. It likewise makes no difference, nor does it interrupt the drive of the conveyor, to change that adjustment of the upper end of the loading trough during movement of the loading machine. Consequently, at any desired time an operator may, by a simple movement of the crank 39 raise or lower the upper end of the loading trough to a desired height without interrupting operation of the loading machine.

It will be further noted that the mechanism herein provided for raising and lowering the loading trough as desired and still maintaining the drive of the endless conveyor from the wheels of the machine is simple in construction, economical to manufacture, and highly durable.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an agricultural loading machine, a mobile underframe, upstanding frame means carried by said underframe including a fixed frame portion and a frame portion movable relatively thereto, an inclined loading trough pivotally connected intermediate its ends to said movable frame portion, said fixed and movable frame portions being in the form of telescoping channel members, apertured means projecting from the movable frame portion, a transverse shaft on the fixed frame portion, and sprocket means on said shaft engageable with said apertured means to cause movement of the movable frame portion.

2. In an agricultural loading machine, an undercarriage including wheels, upstanding frame means on said undercarriage and including both fixed and movable frame portions, an inclined loading trough pivotally connected intermediate its ends to the movable frame portion, an endless conveyor associated with said trough, chain and sprocket means to drive said conveyor from one of the wheels on the undercarriage, and part of said chain and sprocket means being carried by the movable frame portion and movable therewith.

3. In an agricultural loading machine, an undercarriage including wheels, upstanding frame means on said undercarriage and including both fixed and movable frame portions, an inclined loading trough pivotally connected intermediate its ends to the movable frame portion, an endless conveyor associated with said trough, and a chain and sprocket arrangement to drive said conveyor from a wheel on the undercarriage, said arrangement including a sprocket associated with the wheel, a pair of spaced sprockets carried by the movable frame portion, and a sprocket mounted on the fixed frame portion in position to cause a reentrant reach of the chain.

4. In an agricultural loading machine, an undercarriage including wheels, upstanding frame means on said undercarriage and including both fixed and movable frame portions, an inclined loading trough pivotally connected intermediate its ends to the movable frame portion, an endless conveyor associated with said trough, and a chain and sprocket arrangement to drive said conveyor from a wheel on the undercarriage, said arrangement including a sprocket associated with the wheel, a pair of spaced sprockets carried by the movable frame portion, and a sprocket mounted on the fixed frame portion in position to cause a reentrant reach of the chain, a shaft carrying the uppermost of the sprockets on the movable frame portion, and conveyor drive means on said shaft.

5. In an agricultural loading machine, an undercarriage including wheels, upstanding frame means on said undercarriage and including both fixed and movable frame portions, an inclined loading trough pivotally connected intermediate its ends to the movable frame portion, an endless conveyor associated with said trough, and a chain and sprocket arrangement to drive said conveyor from a wheel of the undercarriage of which a part is carried by the movable frame portion and which is positioned to permit raising and lowering of the movable frame portion.

6. In an agricultural loading machine, an undercarriage including wheels, upstanding frame means on said undercarriage and including both fixed and movable frame portions, an inclined loading trough pivotally connected intermediate its ends to the movable frame portion, an endless conveyor associated with said trough, and a chain and sprocket arrangement to drive said conveyor from a wheel of the undercarriage of which a part is carried by the movable frame portion and which is arranged to provide a reentrant reach in the chain which may be varied in length in accordance with the elevation of said movable frame portion, and continuously acting chain tightening means acting on the chain of said arrangement.

7. In an agricultural loading machine, a mobile frame including upstanding fixed and movable portions, each said portion including both side rails and bracing cross rods, the side rails of said fixed frame portion being channel-like in character to telescopically receive the side rails of the movable frame portion, an inclined loading trough pivoted intermediate its ends to said movable frame portion, and means rigidly affixed to and extending across the fixed frame portion to act directly upon the side rails of the movable frame portion to selectively raise and lower said movable frame portion to vary the height of the upper end of said trough.

EVERETT H. APPEL.

REFERENCES CITED

The following references are of record in the file of this patent:

UNITED STATES PATENTS

| Number | Name | Date |
|---|---|---|
| 1,505,732 | Simon | Aug. 19, 1924 |
| 2,205,013 | Joy | June 18, 1940 |
| 2,343,444 | Coon | Mar. 7, 1944 |
| 2,372,902 | Lewis | Apr. 3, 1945 |
| 2,389,759 | Blank et al. | Nov. 27, 1945 |
| 2,395,075 | Smith | Feb. 19, 1946 |